United States Patent [19]

Eguchi et al.

[11] Patent Number: 4,655,538

[45] Date of Patent: Apr. 7, 1987

[54] TERMINAL CONNECTING DEVICE FOR PULLING-TYPE BREAKER

[75] Inventors: Kiyoshi Eguchi; Takayoshi Ishikawa; Shigemi Tamaru; Yasushi Genba; Tsutomu Sera, all of Hiroshima, Japan

[73] Assignee: Mitsubishi Denki Kabushiki Kaisha, Tokyo, Japan

[21] Appl. No.: 825,671

[22] Filed: Nov. 20, 1985

Related U.S. Application Data

[63] Continuation of Ser. No. 362,945, Mar. 29, 1982, abandoned.

[30] Foreign Application Priority Data

Mar. 30, 1981 [JP] Japan .................................. 56-49136
Mar. 30, 1981 [JP] Japan .................................. 56-47213

[51] Int. Cl.$^4$ ............................................. H01R 11/22
[52] U.S. Cl. ................................ 339/255 P; 339/64 R
[58] Field of Search ....................... 339/64 R, 255 P

[56] References Cited

U.S. PATENT DOCUMENTS

| | | | |
|---|---|---|---|
| 2,029,028 | 1/1936 | Kneass et al. ................. | 200/166 |
| 2,303,425 | 12/1942 | Bickham et al. ................. | 200/166 |
| 3,427,419 | 2/1969 | Findley, Jr. et al. ................. | 200/166 |
| 3,566,335 | 2/1971 | Powell ................. | 339/255 P |
| 3,723,940 | 3/1973 | Leonard ................. | 339/255 P |
| 4,445,732 | 5/1984 | Wafer ................. | 339/255 P |
| 4,590,343 | 5/1986 | Berta et al. ................. | 339/255 P |

FOREIGN PATENT DOCUMENTS

| | | | |
|---|---|---|---|
| 909717 | 4/1954 | Fed. Rep. of Germany ... | 339/255 R |
| 133875 | 1/1979 | Fed. Rep. of Germany ... | 339/255 P |
| 1378069 | 10/1964 | France ................. | 339/255 P |
| 1431889 | 2/1965 | France . | |
| 45-15376 | 6/1970 | Japan . | |
| 55-82009 | 6/1980 | Japan . | |
| 187863 | 10/1966 | U.S.S.R. ................. | 339/255 P |

Primary Examiner—Eugene F. Desmond
Assistant Examiner—Paula A. Austin
Attorney, Agent, or Firm—Sughrue, Mion, Zinn, Macpeak & Seas

[57] ABSTRACT

A terminal connecting device has a plurality of movable contacts which are biased toward each other by springs to an extent limited by a spacer carried by the frame. The device is easily assembly by fitting shafts through bores in the contacts and using spring holders inserted between pairs of contacts and locked by wedges to exert a biasing force urging opposed contacts together. The shafts are held by support and frame members having open recesses, as opposed to bores, therein.

10 Claims, 6 Drawing Figures

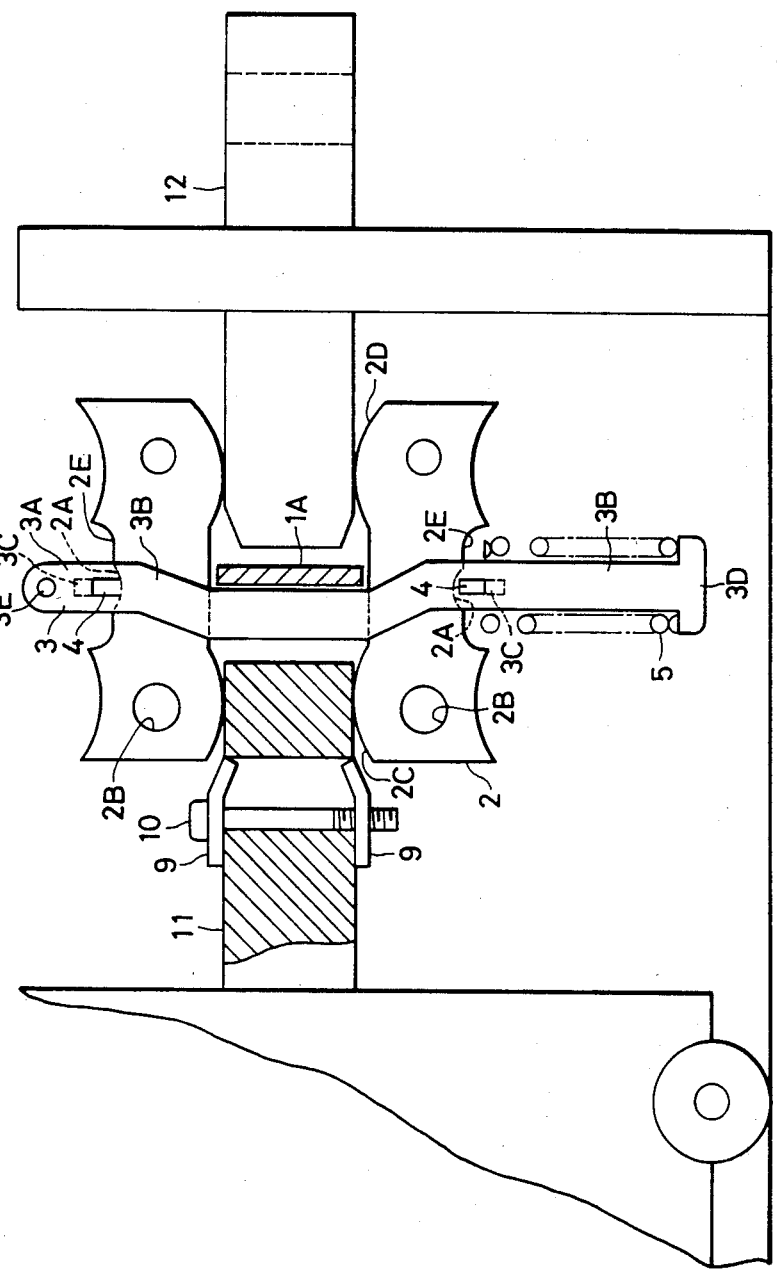

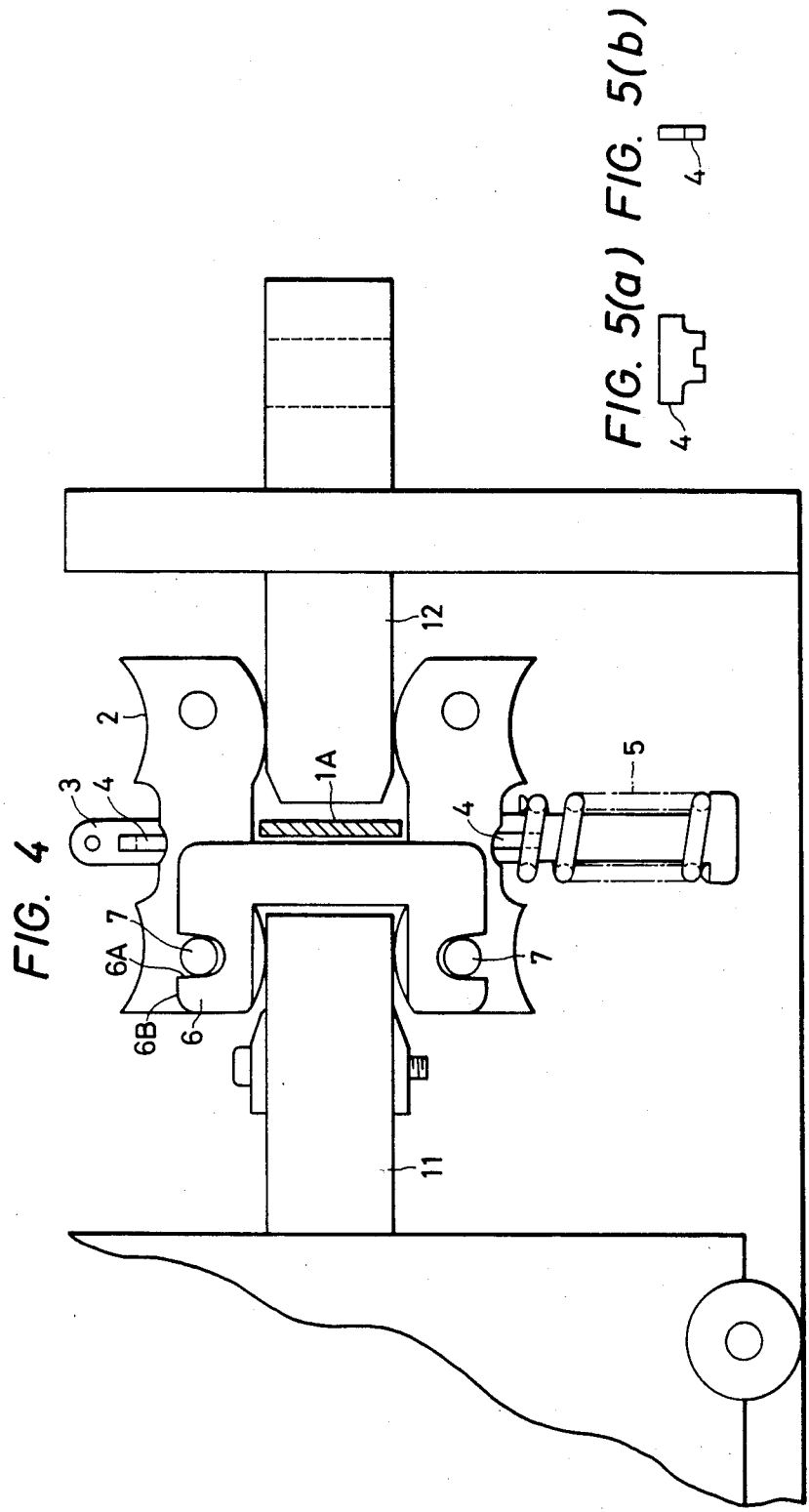

TERMINAL CONNECTING DEVICE FOR PULLING-TYPE BREAKER

This is a continuation of application Ser. No. 362,945 now abandoned, filed Mar. 29, 1982.

BACKGROUND OF THE INVENTION

This invention relates to a pulling-type breaker, and more particularly, to a connecting device which is used for connecting the terminal conductor of a main body of the breaker with the terminal conductor of a pulling device. The present invention is an improvement over the connecting device shown in FIGS. 1 and 2 of Japanese Utility Model Laid Open No. 55-82009.

Such a connecting device is generally composed of a number of contactors arranged in parallel with a terminal conductor inserted therebetween, so that connection by pulling or pressing may be easily effected and a high electric current will be able to pass therethrough. The contactors are usually supported by an axle inserted into through holes of a frame to allow them to turn about an axis. The size of the terminal connecting device of such a pulling-type breaker becomes larger, and the support axis becomes longer, because of the high number of contactors set in parallel, and therefore, an axle supporter is disposed in a space between two adjacent rows of the contactors, and is supported by the axle inserted into the through-hole of the frame together with the contactors. Therefore, the structure is complicated, and this tends to cause difficulties in assembly. Also, it is difficult to produce on a large scale a device of constant and stable quality, because of the complicated structure.

Also, when the distribution of the pressure applied by press contacting springs upon the contactors is unequal, the insertion or removal of a conductor may become difficult because of too much pressure and, in the opposite case, the contacting pressure becomes insufficient.

SUMMARY OF THE INVENTION

This invention has been accomplished to eliminate those problems mentioned above, and in the following the preferred embodiments of the invention will be more particularly described.

BRIEF DESCRIPTION OF THE DRAWINGS

FIG. 3 is a cross-sectional view taken along the line A—A of FIG. 2;

FIG. 4 is a cross-sectional view taken along the line B—B of FIG. 2; and

FIGS. 5(a) and 5(b) are front and side views of a wedge member, respectively.

DETAILED DESCRIPTION OF THE EMBODIMENTS

Figure 1:
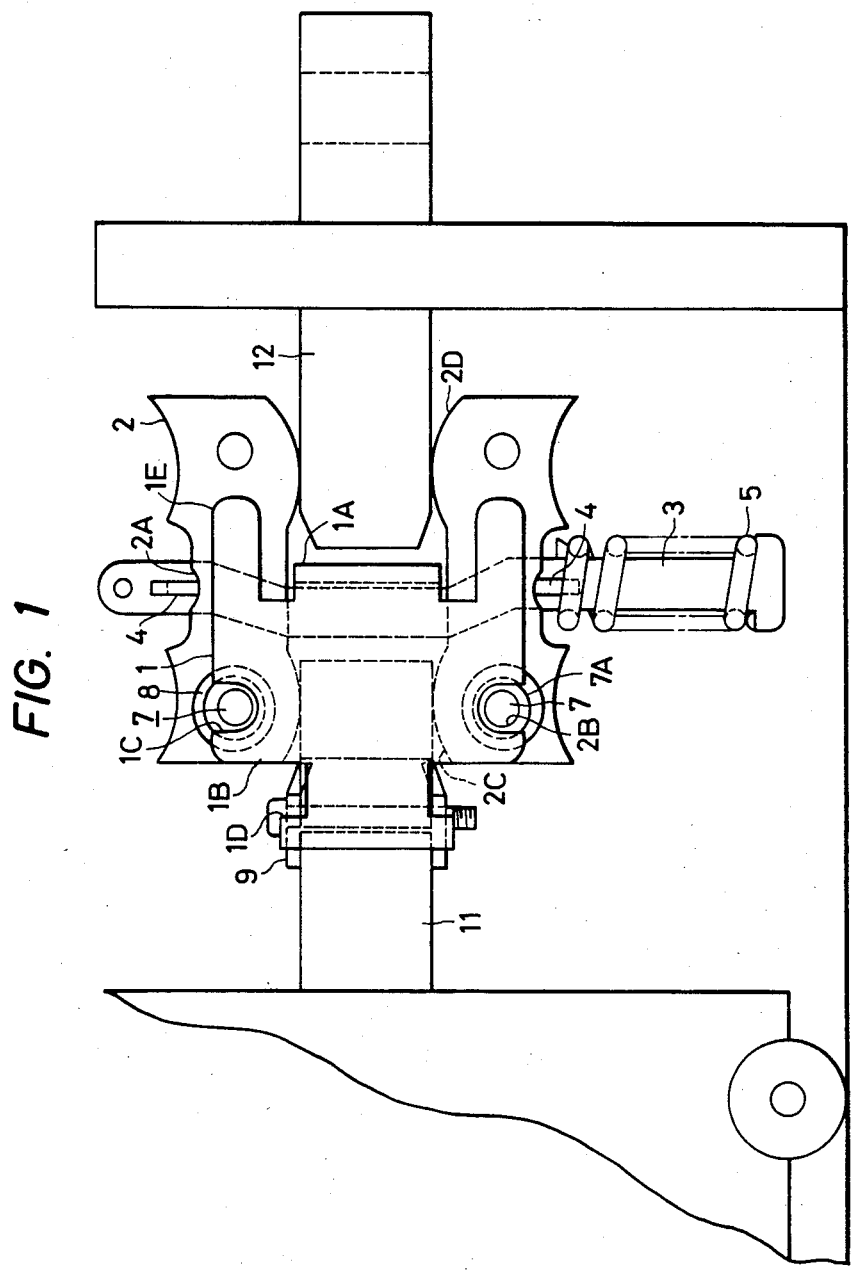
FIG. 1 illustrates one embodiment of this invention.
Figure 2:
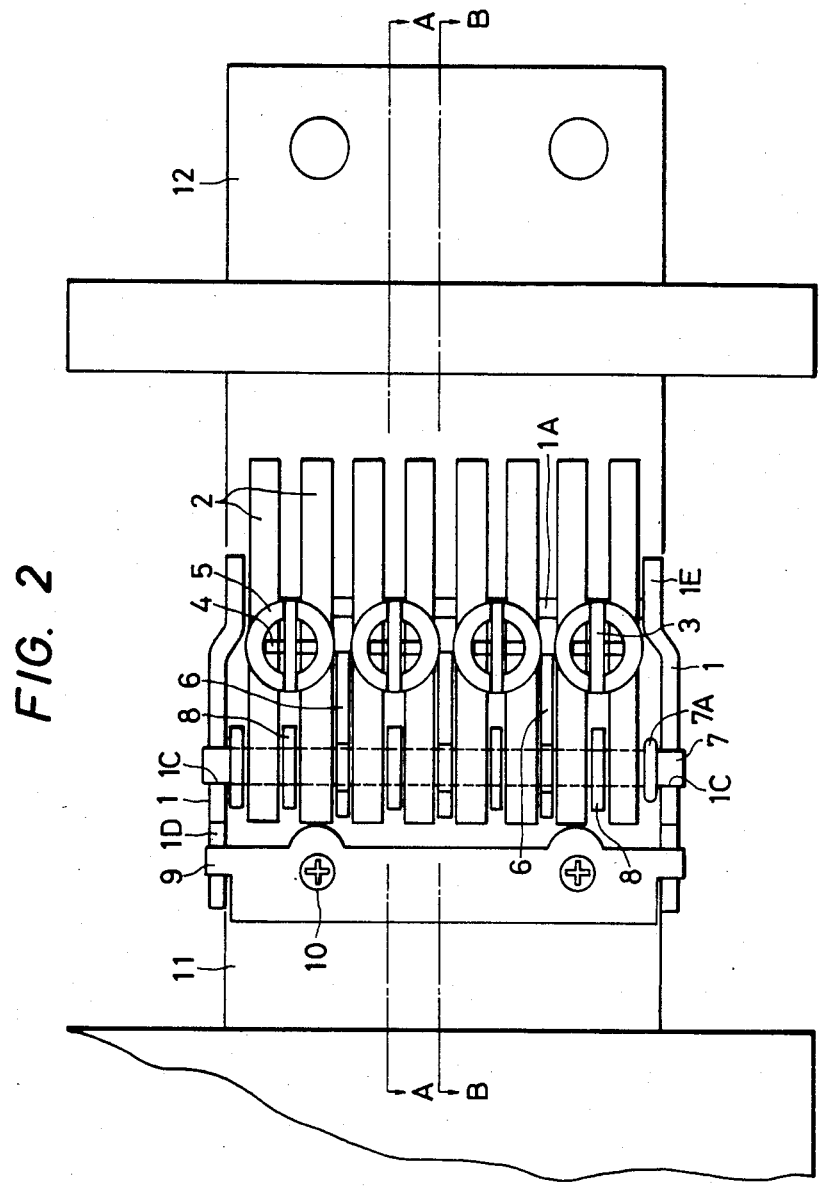
FIG. 2 is a bottom view of the FIG. 1 device.

Designated at 1 is a frame forward of a non-magnetic metal plate, e.g. a stainless plate, which has a spacer 1A which determines the facing distance between plural pairs of contactors 2 (described hereafter) and bracket portions 1B formed by bending each side of the spacer 1A into nearly an L-shape, to thereby form a U-shape overall. Each bracket portion 1B has an opened support slot 1C for supporting a support axle 7, the slots being oppositely directed (described hereafter), a fastening fixture engaging slot 1D with which a fastening fixture 9 will be engaged, and a positioning finger portion 1E which determines the position of the contactors 2 when arranged.

Reference numeral 2 denotes contactors of a conductive material such as copper or brass, which are arranged symmetrically with spacer 1A of the frame 1 therebetween, a plural number of pairs being arranged in symmetrical order.

Each contactor 2 includes, as will be described later, a pressing portion 2A engaging a wedge 4, a support hole 2B into which a support axle 7 is inserted, and contacting portions 2C, 2D which contact terminal conductors 11, 12. A spring holder 3 of a non-magnetic metal is inserted into spaces between every two rows of the contactors 2 arranged in plural pairs. The spring holder 3 has wedge holes 3C (FIG. 3) used for receiving wedges 4 at positions located in the back sides 2E of the contactor 2, a head portion 3D for holding a press spring 5, and a pulling hole 3E. The spring holder 3 is composed of a straight-line portion 3A and a bow-shaped portion 3B and is inserted in a position such that the center line of the straight-line portion 3A nearly passes through the spacer 1A of the frame 1 and the pressing portion 2A of the contactor 2, while the bow-shaped part 3B bypasses the spacer 1A.

A wedge 4 to be fitted into the wedge hole 3C has a shape as shown in FIG. 5. The wedge 4 is fitted into the wedge hole, and the press spring 5 is interposed between the head portion 3D of the spring holder 3 and the wedge 4. The fitting method of the spring holder 3, the press spring 5, and the other parts will be later described. A first spacer plate 6 of a non-magnetic metal is set into those spaces between the two adjacent rows of contactors 2 where the spring holders 3 have not been inserted. As shown in FIG. 4, the first spacer 6 is formed with opened support slots 6A similar to those formed in the frame 1.

Element 7 is a support axle having a flange 7A at one end, which is inserted into the support holes 2B of the contactors 2 and is supported at the opened support slots 1C of the bracket portions 1B at both ends thereof. In the supported condition, the flange 7A locates between the bracket portion 1B and the contactors 2, and serves to prevent the support axle 7 from slipping out (moving in the axial direction).

A second spacer 8 is formed into a round washer shape. 9 is a fastening fixture, both ends of which are engaged with the fastening fixture engaging slots 1D of the bracket portions 1B and which is clamped by small screws 10 to hold the terminal conductor therebetween. By tightening the fastening fixtures 9, the terminal connecting device of this invention is mounted to the terminal conductor 11.

The device is assembled and operated as follows.

First, the support axle 7 is inserted into each pair of contactors 2. The second spacer 8 is set between bracket portion 1B of the frame and the contactors 2, and between every two rows of the contactors 2 at this time. The spacers 8 separate the contactors and allow them to be turned easily. The support axle 7, after insertion into the contactors 2 as described above, is fitted into the opened support slots 1C formed in the bracket portions 1B of the frames 1 so as to be supported. On this occasion, the first spacer 6 is set into each space between adjacent rows of contactors where the second spacer 8 was not inserted, the shaft 7 fitting into the recess 6A from the open side thereof. The contactors are now arranged in parallel and oppossite each other.

Next, the press spring 5 and the wedge 4 are fitted on the side of the head portion 3D of the spring holder 3, and the spring holder 3 is inserted into each space between adjacent rows of contactors where the second spacer 8 was set. When a pulling tool (not shown) for assembling the device is hooked in the pulling hole 3E and pulled, the press spring 5 is compressed, and the wedge hole 3C (at the top of the drawings) is exposed at the back 2E of the contactor 2. The wedge 4 is then fitted into this wedge hole 3C, and the pulling tool disengaged, such that the contactors are arranged parallel to and confronting one another. As for the relationship between the length of the wedge hole and the width of the wedge, the wedge hole located at the distal end of the spring holder has been designed to be long enough to protrude sufficiently from the back 2E of the contactor 2 when the press spring 5 is compressed in the assembling operation described above.

As stated above, with the press spring 5 interposed between the spring holder 3 and the wedge 4, the contactors 2 are pressed between the wedges 4 and the plural pairs of the contactors 2 will be arranged containing the spacer 1A of the frame 1 therebetween.

Next, at the time when the connecting device is fixed to the terminal conductor 11 of the breaker, the terminal conductor 11 is inserted into the space between plural pairs of the contactors 2 on one side. Each support axle 7 moves outwardly a small distance in the opened support slot 1C upon this insertion. Both ends of the fastening fixture 9 are engaged with the fastening fixture engaging slots 1D of the bracket portions 1B and are clamped by the small screws 10 in order to hold the inserted breaker conductor 11 therebetween. In this connection, the busbar fixing hole in the terminal conductor 11 is used for fixing in this case.

A main bordy of the breaker including the thus assembled terminal connecting device is mounted on the pulling device and then the terminal conductor 12 of the pulling device is connected thereto. The connection, in this case, is performed by inserting the terminal conductor 12 into the space between the plural pairs of contactors 2. The press springs 5 will be compressed by the insertion and the contactors 2 will be contacted with the terminal conductor 12 by the compression of these press springs 5.

Although, in the description above, the terminal connecting device is fixed to the breaker terminal conductor 11, the pulling device terminal conductor 12 is of course also available for this purpose.

The terminal connecting device assembled as described above makes it possible to fit the plural pairs of contactors 2, supported by the support axle 7 extending therethrough, into the bracket part 1B of the frame 1 and restrict the movement of the support axis 7 in the axial direction thereof by means of the flange 7A in the assembled state, whereby no additional part is required for preventing such movement. Furthermore, as for the press spring 5, it is located in a space between the rows of the contactors 2 after having been fitted on the spring holder 3 and compressedly held by the wedge 4.

With the arrangement as described above, since the pressure of the press spring 5 is applied to the contactor 2 through the wedge 4, which is abutted with the pressing portion 2A and precisely located on the back side of the contactor 2, a uniform pressure is exerted upon the contactor 2 at all times.

In particular, in the case where the press spring 5 is pressed directly against the pressing portion 2A, there is a possibility of deviation with respect to the point where the pressure is applied to the contactor 2, depending on the shape of the end of the spring. This deviation can cause the contact pressures upon the contactor 2 to be unequal at the contact portions 2C, 2D on either side. If the pressure on one side becomes stronger, that on the other side becomes weaker. Consequently, the insertion and removal of the conductors 11, 12 becomes difficult because the pressure is too high on one side and insufficient on the other.

In the device according to the invention, as the pressing portion 2A is pressed via the wedge 4, the occurrence of an unequal pressure as described above is less likely, and thus a stable contact pressure is constantly available.

With the above arrangement, the structure is simple and the assembling operation easy in spite of the fact that the terminal connecting device uses a number of contactors.

As described hitherto, since the parts into which the support axle is inserted include only the contactors and the washers, and since the engagement of the frames and the axle supporters with the support axle is easily completed by fitting the support axle into the recesses of the former from the open side, assembly is very simple. In addition, as the axle engagement portions of the frame and axle supporter are formed as recesses, manufacturing tolerances will not be a problem, and defects due to boring errors will be eliminated.

As the support axle for the contactors is fitted in the opened support slot so as to be movable, the connecting condition with the terminal conductor is subject to less variation, resulting in a terminal connecting device of stable quality.

What is claimed is:

1. A terminal connecting device, comprising: a plurality of contactor pairs arranged with a space therebetween; a frame member having L-shaped bracket portions at either end of a spacer such that said spacer portion is disposed in said space and said frame member is U-shaped overall, said L-shaped bracket portions having recesses in opposite arms of the U-shaped frame member, said recesses opening in opposite directions with respect to each other, shafts extending through holes provided in said contactors, said shafts being supported by said recesses, and means for urging said contactor plates toward one another so as to bear against terminals inserted between said pair of contactors;

said urging means comprising spring holder means inserted between ones of said plural contactors, and spring means connected to said holder and bearing upon a back side of said contactors; and wedge means inserted in said holder means on an end thereof opposite said spring and bearing upon an opposite back side of said contactors.

2. A terminal connecting device as claimed in claim 1, wherein said frame is secured to one of said terminals by means of a clamp-type fastening fixture for engagement with fastening fixtures engaging slots of said bracket portions.

3. A terminal connecting device as claimed in claim 1, said spring holder means having linear portions substantially aligned with said spacer.

4. A terminal connecting device as claimed in claim 1, further including shaft support members arranged between ones of said contactors for supporting said shafts longitudinally.

5. A terminal connecting device as claimed in claim 4, said shaft support members being arranged between different ones of said contactors than said spring holder means.

6. A terminal connecting device as claimed in claim 1, further including washer members disposed on said shaft and between one of said contactors.

7. A terminal connecting device as claimed in claim 6, said washers being disposed between same ones of said contactors as said spring holder means.

8. A terminal connecting device for a pulling-type breaker, comprising: a frame including a spacer, and bracket portions formed by bending the sides of said spacer into a U-shape; plural pairs of contactors arranged facing each other with said spacer of said frame therebetween; a plurality of spring holders, each being inserted into a space between rows of said plural pairs of contactors; a wedge fitted to each said spring holder for engagement with the center of the back side of said contactor; press springs fitted to each said spring holder for pressing each of said plural pairs of contactors closed through said wedge; support shafts, each having a flange formed at one end, the other end thereof being inserted into through-holes bored in one side of said contactors; an opened support slot formed in each said bracket portion to support said support shafts; and fastening fixtures to secure said bracket portions to a terminal conductor by screwing the said fixtures to said terminal conductor, said conductor being inserted between said plural pairs of contactors on one side thereof with both ends of the conductor engaged with said bracket portions, the other terminal conductor being inserted between said plural pairs of contactors at the other side thereof.

9. A terminal connecting device for a pulling-type breaker, comprising: a frame including a spacer, and bracket portions formed by bending the sides of said spacer into a U-shape; plural pairs of contactors arranged facing one another with said spacer of said frame therebetween; spring holders, each composed of a straight portion and a bow-shaped portion and inserted into a space between the rows of said plural pairs of contactors in a position such that a center line of said straight-line portion nearly passes through said spacer and pressing portions of each said contactor and such that said bow-shaped portion bypasses said spacer; a wedge fitted to each said spring holder so as to be engaged with the center of the back side of each said contactor; pressing springs fitted to said spring holders in order to press each of said plural pairs of contactors closed through said wedge; a support shaft inserted into through-holes bored in said contactors and being supported by a recess in each of said bracket portions; and a fastening fixture for securing said frame to one terminal conductor between said plural pairs of contactors on one side thereof; the other terminal conductor being inserted between said plural pairs of contactors at the other side thereof.

10. A terminal connecting device for a pulling-type breaker, comprising: a frame including a spacer, and bracket portions formed by bending the sides of said spacer into a U-shape, recesses being formed at both ends of said bracket portions and having the bottoms thereof arranged opposite to one another; a plurality of rows of contactors arranged inside the bracket portions of said frame in parallel and facing one another with said spacer therebetween, and each having a through-hole bored at the end thereof and arranged opposite to the recess of said frame; shaft supporters each inserted into a space between adjacent rows of said contactors such that recesses formed at both end sides of said shaft supporters are positioned aligned with the through-holes of each of said contactors; a washer set into each space between adjacent rows of said contactors where said shaft supporters are not inserted; shafts extending through said washers and the through-holes of said contactors and being supported by the recesses of said frames and said shaft supporters; elastic members each positioned at the back of one line of said contactors; said spring holders extending through said each elastic member and locked against the other line of said contactors, said contactors in said two lines being urged by said elastic members toward one another.

* * * * *